United States Patent
Favaloro et al.

(10) Patent No.: US 10,201,918 B1
(45) Date of Patent: Feb. 12, 2019

(54) MOLDING SYSTEM FOR PREPARING FIBER-REINFORCED THERMOPLASTIC COMPOSITE ARTICLE

(71) Applicants: PURDUE RESEARCH FOUNDATION, West Lafayette, IN (US); CORETECH SYSTEM CO., LTD., Chupei, Hsinchu County (TW)

(72) Inventors: Anthony J. Favaloro, Collierville, TN (US); Robert Byron Pipes, Lafayette, IN (US); Huan-Chang Tseng, Chupei (TW)

(73) Assignees: CORETECH SYSTEM CO., LTD., Chupei, Hsinchu County (TW); PURDUE RESEARCH FOUNDATION, West LaFayette, IN (US)

(*) Notice: Subject to any disclaimer, the term of this patent is extended or adjusted under 35 U.S.C. 154(b) by 0 days.

(21) Appl. No.: 16/027,925

(22) Filed: Jul. 5, 2018

(51) Int. Cl.
  *B29C 43/58* (2006.01)
  *B29C 43/00* (2006.01)

(52) U.S. Cl.
  CPC ............ *B29C 43/58* (2013.01); *B29C 43/003* (2013.01); *B29C 2043/5808* (2013.01); *B29C 2043/5816* (2013.01)

(58) Field of Classification Search
  CPC ............ B29C 43/58; B29C 2043/5808; B29C 2043/5816
  See application file for complete search history.

(56) References Cited

U.S. PATENT DOCUMENTS

| 8,463,584 B2* | 6/2013 | Yu | B29C 33/3835 |
| | | | 700/197 |
| 9,283,695 B1* | 3/2016 | Tseng | B29C 45/7693 |
| 9,573,307 B1* | 2/2017 | Tseng | B29C 45/7693 |
| 2002/0188375 A1* | 12/2002 | Shioiri | B29C 45/766 |
| | | | 700/200 |
| 2004/0047935 A1* | 3/2004 | Moss | B29C 45/27 |
| | | | 425/145 |

OTHER PUBLICATIONS

Bird, R.B. et al., "Dynamics of Polymeric Liquids: Fluid Mechanics" 1987, 670 pages, vol. 1-2.

(Continued)

*Primary Examiner* — James Sanders
(74) *Attorney, Agent, or Firm* — Muncy, Geissler, Olds & Lowe, P.C.

(57) ABSTRACT

The present disclosure provides a molding system for preparing a fiber-reinforced thermoplastic (FRT) composite article, including a molding machine; a mold disposed on the molding machine and having a mold cavity to be filled with a composite molding resin including a polymeric material having a plurality of fibers; a processing module configured to generate an anisotropic viscosity distribution of the composite molding resin in the mold cavity based on a molding condition for the molding machine; and a controller coupled to the computing apparatus and configured to control the molding machine with the molding condition to perform an actual molding for the composite molding resin. The anisotropic viscosity distribution of the composite molding resin is generated by taking into consideration an orientation distribution of the fibers in the composite molding resin.

13 Claims, 11 Drawing Sheets

(56) References Cited

OTHER PUBLICATIONS

Chang, Rong-Yeu, Numerical Simulation of Mold Filling in Injection Molding Using a Three-Deminsional Finite Volume Approach International Journal for Numerical Methods in Fluids, Sep. 30, 2001, pp. 125-148, vol. 37, Issue 2.
Cross, M.M., "Relation between viscoelasticity and shear-thinning behaviour in liquids," Rheol Acta, Mar. 20, 1979; 609-614, vol. 18-5.
Advani, Suresh Gopaldas, "Prediction of fiber orientation in short fiber composites," University of Illinois, Urbana, 1987, 235 pages.
Advani, Suresh G. & Tucker, Charles L., "The use of tensors to describe and predict fiber orientation in short fiber composites," Journal of Rheology, 1987, pp. 751-784, vol. 31-8.
Beaussart, A.J. et al., "Constitutive relationships for anisotropic viscous materials," Composites Science and Technology, 1993; 335-339, vol. 49.
Pipes, R.B. et al. "Rheological behavior of collimated fiber thermoplastic composite materials" In: Advani SG, editor. Flow and rheology in polymer composites manufacturing. Amsterdam: Elsevier, 1994. p. 85-125.
Ericsson, K.A. et al., "The two-way interaction between anisotropic flow and fiber orientation in squeeze flow" J Rheol 1997; pp. 491-511, vol. 41.
Sommer et al., "Coupling anisotropic viscosity and fiber orientation in applications to squeeze flow" Journal of Rheology, Mar. 29, 2018, pp. 669-679, vol. 62.
Lia et al., "Flow-fiber coupled viscosity in injection molding simulations of short fiber reinforced thermoplastics", May 30, 2018, pp. 1-22.

\* cited by examiner

US 10,201,918 B1

MOLDING SYSTEM FOR PREPARING FIBER-REINFORCED THERMOPLASTIC COMPOSITE ARTICLE

TECHNICAL FIELD

The present disclosure relates to a molding system for preparing a composite article, and more particularly, to a compression molding system for preparing a fiber-reinforced thermoplastic (FRT) composite article using a computer-aided engineering (CAE) simulation.

DISCUSSION OF THE BACKGROUND

Fiber-reinforced thermoplastic (FRT) composite articles produced by molding techniques, such as glass mat thermoplastics (GMT) produced by compression molding, have assumed great importance in the manufacture of many products due to their specific mechanical properties, including tensile strength, electrical conductivity, and other characteristics. In order to optimize the quality of the FRT composite articles, it is desirable to accurately predict molding phenomena occurring during a molding process. However, despite significant efforts by many researchers, simulations have thus far failed to achieve satisfactory results.

This Discussion of the Background section is provided for background information only. The statements in this Discussion of the Background are not an admission that the subject matter disclosed in this section constitutes prior art to the present disclosure, and no part of this Discussion of the Background section may be used as an admission that any part of this application, including this Discussion of the Background section, constitutes prior art to the present disclosure.

SUMMARY

The present disclosure provides a molding system for preparing a fiber-reinforced thermoplastic (FRT) composite article, comprising a molding machine; a mold disposed on the molding machine and having a mold cavity to be filled with a composite molding resin including a polymeric material having a plurality of fibers; a processing module configured to generate an anisotropic viscosity distribution of the composite molding resin in the mold cavity based on a molding condition for the molding machine, wherein the anisotropic viscosity distribution of the composite molding resin is generated by taking into consideration an orientation distribution of the fibers in the composite molding resin; and a controller coupled to the computing apparatus and configured to control the molding machine with the molding condition to perform an actual molding for the composite molding resin.

In some embodiments, the anisotropic viscosity distribution of the composite molding resin carries information of the orientation distribution of the fibers.

In some embodiments, the anisotropic viscosity distribution of the composite molding resin is represented using an expression:

$$\eta^{IISO} = \frac{D:\eta_4:D}{2D:D}$$

where $\eta^{IISO}$ represents an informed isotropic (IISO) viscosity, D represents a rate-of-strain tensor, and $\eta_4$ represents a fourth-order viscosity tensor.

In some embodiments, the processing module is configured to generate a stress distribution of the composite molding resin by taking into consideration the anisotropic viscosity distribution.

In some embodiments, the stress distribution of the composite molding resin is represented using an expression:

$$\tau = 2\eta^{IISO}D$$

$$\eta^{IISO} = \frac{D:\eta_4:D}{2D:D}$$

where $\tau$ represents a stress tensor, $\eta^{IISO}$ represents an informed isotropic (IISO) viscosity, D represents a rate-of-strain tensor, and $\eta_4$ represents a fourth-order viscosity tensor.

In some embodiments, the processing module is configured to convert the anisotropic viscosity distribution of the composite molding resin from a tensor form into a scalar form.

In some embodiments, the anisotropic viscosity distribution of the composite molding resin is represented using a fourth-order viscosity tensor.

In some embodiments, the anisotropic viscosity distribution is represented in the scalar using an expression:

$$\eta^{IISO} = \frac{D:\eta_4:D}{2D:D}$$

where $\eta^{IISO}$ represents an informed isotropic (IISO) viscosity, D represents a rate-of-strain tensor, and $\eta_4$ represents the fourth-order viscosity tensor.

In some embodiments, the processing module is configured to convert the viscosity distribution of the composite molding resin from a tensor form into a scalar form by applying an equation of viscous dissipation energy.

In some embodiments, a rate of viscous dissipation energy is represented in the scalar form using an expression:

$$\dot{E}_D = \eta\dot{\gamma}^2$$

where $\eta$ represent a shear viscosity and $\dot{\gamma}^2$ represent a shear rate square.

In some embodiments, the tensor form of the anisotropic viscosity distribution is represented using an expression:

$$\eta\dot{\gamma}^2 = D:\eta_4:D$$

where $\eta_4$ represents a fourth-order viscosity tensor, and D represents a rate-of-strain tensor.

In some embodiments, the present disclosure uses the four-order orientation tensor to generate the anisotropic viscosity distribution, the informed isotropic (IISO) viscosity; consequently, the anisotropic viscosity distribution carries the orientation distribution of the fibers. Subsequently, the anisotropic viscosity distribution is used in the CAE software to solve the governing equations of the molding process based on a molding condition for the molding machine.

The foregoing has outlined rather broadly the features and technical advantages of the present disclosure in order that the detailed description of the disclosure that follows may be better understood. Additional features and advantages of the disclosure will be described hereinafter, and form the subject of the claims of the disclosure. It should be appreciated by those skilled in the art that the conception and specific embodiment disclosed may be readily utilized as a basis for modifying or designing other structures or processes for carrying out the same purposes of the present disclosure. It should also be realized by those skilled in the art that such equivalent constructions do not depart from the spirit and scope of the disclosure as set forth in the appended claims.

BRIEF DESCRIPTION OF THE DRAWINGS

A more complete understanding of the present disclosure may be derived by referring to the detailed description and claims when considered in connection with the Figures, where like reference numbers refer to similar elements throughout the Figures; and:

FIGS. 1A and 1B are schematic diagrams illustrating a compression molding process of a composite molding resin, wherein FIG. 1B shows an anisotropic flow pattern during the compression molding process.

DETAILED DESCRIPTION

The following description of the disclosure accompanies drawings, which are incorporated in and constitute a part of this specification, and illustrate embodiments of the disclosure, but the disclosure is not limited to the embodiments. In addition, the following embodiments can be properly integrated to complete another embodiment.

References to "one embodiment," "an embodiment," "exemplary embodiment," "other embodiments," "another embodiment," etc. indicate that the embodiment(s) of the disclosure so described may include a particular feature, structure, or characteristic, but not every embodiment necessarily includes the particular feature, structure, or characteristic. Further, repeated use of the phrase "in the embodiment" does not necessarily refer to the same embodiment, although it may.

The present disclosure is directed to a molding system for preparing a fiber-reinforced thermoplastic (FRT) composite article using a computer-aided engineering (CAE) simulation. In order to make the present disclosure completely comprehensible, detailed steps and structures are provided in the following description. Obviously, implementation of the present disclosure does not limit special details known by persons skilled in the art. In addition, known structures and steps are not described in detail, so as not to limit the present disclosure unnecessarily. Preferred embodiments of the present disclosure will be described below in detail. However, in addition to the detailed description, the present disclosure may also be widely implemented in other embodiments. The scope of the present disclosure is not limited to the detailed description, and is defined by the claims.

The FRT composite articles produced by molding techniques, such as glass mat thermoplastics (GMT) produced by compression molding, have assumed great importance in the manufacture of many products for their specific mechanical properties, including tensile strength, electrical conductivity, and other beneficial characteristics.

During a typical compression molding process of a composite molding resin, which usually comprises a polymeric material having a plurality of fibers, the composite molding resin is formed into a circular disk and then isothermally compressed in a compression molding machine at about 200° C. to 20% of its original thickness.

Figure 1B:
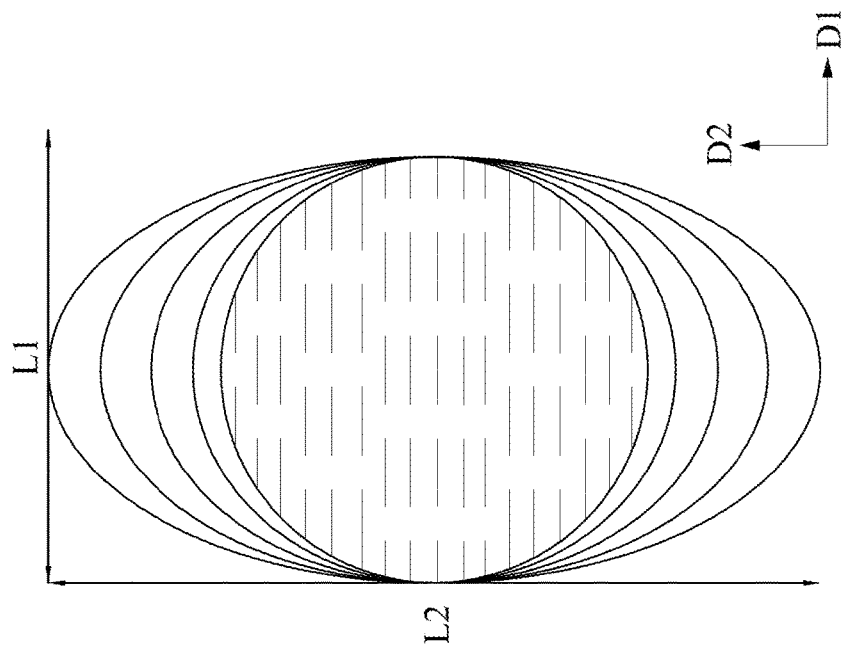
Figure 1A:
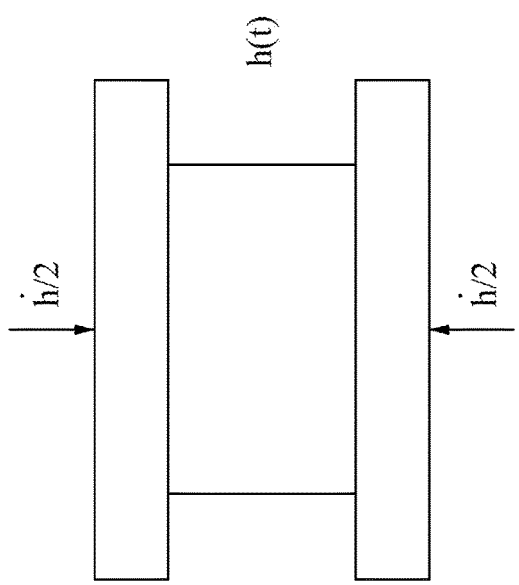

Studies show that the flow patterns of the composite molding resin are anisotropic and depend significantly on the orientation distribution of the fibers therein. For example, please refer to FIGS. 1A and 1B. FIGS. 1A and 1B are schematic diagrams illustrating a compression molding process of a composite molding resin, wherein FIG. 1B shows an anisotropic flow pattern during the compression molding process.

Referring to FIGS. 1A and 1B, during the compression molding process, the composite molding resin charge (having a circular disk shape) between two plates is compressed by a pushed speed (h/2) applied to the composite molding resin charge. In this procedure, during which the composite molding resin charge is also called a squeeze flow, the height (h(t)) of the squeeze flow decreases with time (t) and the melt front of the squeeze flow is deformed into an elliptical shape as shown in FIG. 1B. In FIG. 1B, the length L2 in the direction D2 is greater than the length L1 in the direction D1. This indicates that the melt front moving in direction D2 moves more quickly than the melt front moving in the direction D1.

It is important to note that the flow patterns of the composite molding resin are forced into an elliptical shape as shown in FIG. 1B while undergoing a compression molding process due to fiber-orientation-induced anisotropic flow. However, existing fluid mechanics simulation software used for fiber orientation prediction in molding flows have provided unsatisfactory isotropic flow results, since software was developed assuming the viscosity relationship to be isotropic with temperature and strain rate dependence. The present disclosure solves this challenging anisotropic flow prediction problem.

The flow patterns of the composite molding resin during a compression molding process depend significantly on the fiber orientation distribution, and such flow patterns are anisotropic. The actual flow of the fibers dispersed in the polymeric material is transient, non-Newtonian and non-isothermal. In addition, the compression molding process is highly nonlinear, since the material properties of the composite molding resin are dependent upon the rheological and thermal conditions.

Polymeric materials having fibers are generally assumed to be Generalized Newtonian Fluid (GNF) (See, Bird R B, Armstrong, R. C. & Hassager, O. (1987). *Fluid mechanics*. (2nd edition). New York: Wiley-Interscience, the entirety of which is incorporated herein by reference). The governing equations of the fluid mechanics which describe the transient and non-isothermal flow motion are as follows:

$$\frac{\partial \rho}{\partial t} + \nabla \cdot \rho u = 0 \tag{1}$$

$$\frac{\partial}{\partial t}(\rho u) + \nabla \cdot (\rho u u - \sigma) = \nabla \cdot \sigma + \rho g \tag{2}$$

$$\sigma = -pI + \tau \tag{3}$$

$$\rho C_P \left[ \frac{\partial T}{\partial t} + u \cdot \nabla T \right] = \nabla \cdot (k \nabla T) + \eta \dot{\gamma}^2 \tag{4}$$

Where $\rho$ is a density, t is a time, u is velocity vector, $\sigma$ and $\tau$ are total stress tensor and deviatoric stress tensor, respectively, g is an acceleration vector of gravity, p is a pressure, $\eta$ is an isotropic viscosity, $C_P$ is a specific heat, T is a temperature, k is a thermal conductivity, $\dot{\gamma}$ is a shear rate of $D(\dot{\gamma}=\sqrt{2D:D})$, and D is a rate-of-strain tensor that can be expressed as a symmetric matrix of velocity gradient $\nabla u$, $$D = \frac{\nabla u + (\nabla u)^T}{2}.$$

The equation (4) is also referred to herein as the equation of energy.

Solving the governing equations (1)-(4) require a transient state analysis, which can be performed numerically using a computer. See, for example, Rong-yeu Chang and Wen-hsien Yang, "Numerical simulation of mold filling in injection molding using a three-dimensional finite volume approach", International Journal for Numerical Methods in Fluids Volume 37, Issue 2, pages 125-148, Sep. 30, 2001, the entirety of which is incorporated herein by reference. During the transient state analysis, the process variables that change with time are not zero; i.e., the partial derivatives ($\partial/\partial t$) in the governing equations (1)-(4) are not considered zero.

The GNF's stress tensor $\tau$ is given, $$\tau = 2\eta(\dot{\gamma},T,P)D \tag{5}$$

Wherein the isotropic viscosity $\eta$ is not related to fiber orientation distribution.

The flow curves of shear viscosity dominate the flow behaviors for a variety of materials. Commonly, the Cross-William-Landel-Ferry (Cross-WLF) model (See, Cross (1979). Relation between viscoelasticity and shear-thinning behavior in liquids. *Rheologv Acta*, 18(5), 609-614, the entirety of which is incorporated herein by reference) used in polymer rheology and processing can describe complex viscosity behaviors, including the viscosity $\eta(\dot{\gamma},T,P)$ varying with shear rate $\dot{\gamma}$ for the Cross model and the zero-shear-rate viscosity $\eta_0(T,P)$ depending on temperature T and pressure P for the WLF model, as follows:

$$\eta(\dot{\gamma}, T, P) = \frac{\eta_0(T, P)}{1 + \left(\frac{\eta_0 \dot{\gamma}}{\tau^*}\right)^{1-n}} \tag{6}$$

$$\eta_0(T, P) = D_1 \exp\left[\frac{-A_1(T - T_C)}{A_2 + (T - T_C)}\right] \tag{7}$$

$$T_C = D_2 + D_3 P \tag{8}$$

$$A_2 = \tilde{A}_2 + D_3 P \tag{9}$$

As mentioned above, the flow patterns of the composite molding resin during a compression molding process depend significantly on the fiber orientation distribution, and such flow patterns are anisotropic. However, the viscosity in the Cross-WLF model is not related to fiber orientation distribution. An anisotropic viscosity model that depends on fiber orientation distribution is essential to be developed. To directly capture the effects of anisotropic viscosity, complete reformulation and rebuilding of numerical formulas is required.

Previously, Advani and Tucker found that the orientation averaged, transversely isotropic, fourth-order viscosity tensor $\eta_4=[\eta_{ijkl}]$ is a function of a second-order orientation tensor, $A=[a_{ij}]$ and a fourth-order orientation tensor $A_4=[a_{ijkl}]$ attached with five experimental material constants $H_i$ (See, Advani & Tucker (1990). Closure approximations for three-dimensional structure tensors. *Journal of Rheology* 34(3), 367-386; and Advani & Tucker (1987). The use of tensors to describe and predict fiber orientation in short fiber composites. *Journal of Rheology* 31(8), 751-784, the entirety of which is incorporated herein by reference):

$$\eta_{ijkl}=H_1 A_{ijkl}+H_2(A_{ij}\delta_{kl}+A_{kl}\delta_{ij})+H_3(A_{ik}\delta_{jl}+A_{il}\delta_{jk}+A_{jl}\delta_{ik}+A_{jk}\delta_{il})+H_4(\delta_{ij}\delta_{kl})+H_5(\delta_{ik}\delta_{jl}+\delta_{il}\delta_{jk}) \tag{10}$$

$$H_1=\eta_{11}-4\eta_{12}+\eta_{23} \tag{11}$$

$$H_2 = -\frac{1}{3}\eta_{11} + \eta_{23} \tag{12}$$

$$H_3=\eta_{12}-\eta_{23} \tag{13}$$

$$H_4 = \frac{1}{9}\eta_{11} - \eta_{23} \tag{14}$$

$$H_5=\eta_{23} \tag{15}$$

Here, we adopted the notation of Beaussart et al. (See, Beaussart, Hearle & Pipes (1993). Constitutive relationships for anisotropic viscous materials. *Composites Science and Technology* 49, 335-339, the entirety of which is incorporated herein by reference) that has direct analogy to elastic stiffness which, for transversely isotropic fluids, expresses $\eta_{11}$ as an extensional viscosity in the fiber direction, $\eta_{22}$ as a transverse extensional viscosity, $\eta_{12}$ as an in-plane shear viscosity, and $\eta_{23}$ as the transverse shear viscosity. For the fourth-order viscosity tensor $\eta_4$, the parameters $H_1$ to $H_5$ are related to shear viscosities and extensional viscosities.

According to the article of Pipes et al. (See, Pipes, Coffin, Simacek, Shuler, & Okine (1994). Rheological behavior of collimated fiber thermoplastic composite materials. In Advani (Ed.), *Flow and rheology in polymer composites manufacturing* (pp. 85-125). Amsterdam: Elsevier, the entirety of which is incorporated herein by reference), there are theoretical viscosities described by various models including Newtonian, Power-law, and Carreau model. The effective anisotropic viscosities are described by the Carreau model with respect to respective strain rates for the 25 vol. % long glass fibers (aspect ratio L/D=360 and fiber volume fraction parameter K=2.19) added to polypropylene (PP) at 200° C. The viscosities can be theoretically determined in hyper-concentrated suspensions containing particles of large aspect ratio with unidirectional fiber alignment packing of square and hexagonal geometries.

To date, no researcher has adopted the fourth-order viscosity tensor $\eta_4$ in computational fluid mechanics (CFD) to simulate flow behaviors of FRT composite articles. In the present disclosure, a potentially fully anisotropic fourth-order viscosity tensor $\eta_4 = [\eta_{ijkl}]$ is developed that is a function of orientation tensors, $A = [a_{ij}]$ and $A_4 = [a_{ijkl}]$ as shown in equation (10). In other words, the anisotropic viscosity distribution (fourth-order viscosity tensor, $\eta_4$) carries information of the orientation distribution of the fibers ($A_4$).

Ericsson et al. (See, Ericsson, Toll, & Månson (1997). The two-way interaction between anisotropic flow and fiber orientation in squeeze flow. *Journal of Rheology*, 41, 491, the entirety of which is incorporated herein by reference) and Sommer et al. (See, Sommer, Favaloro, & Pipes. Coupling anisotropic viscosity and fiber orientation in applications to squeeze flow. *Journal of Rheology*, 62, 669-679, the entirety of which is incorporated herein by reference) demonstrated the fourth-order viscosity tensor $\eta_4$ available with the deviatoric stress tensor $\tau$ ($\tau = \eta_4 : D$) to simulate anisotropic flow patterns in squeeze flow. However, such a direct implementation of this viscosity tensor model in existing simulation software may be infeasible for the CFD framework, requiring full formulas reformulation and development. Therefore, we seek to approximate an anisotropic viscosity model, which depends on both fiber orientation tensor and the full rate-of-strain tensor and which is feasible for the CFD framework.

Based on the equation of energy (equation (4)), the rate of viscous dissipation energy is related to shear rate and shear viscosity as follows:

$$\dot{E}_D = \eta \dot{\gamma}^2 \quad (16)$$

This is a scalar form. The shear viscosity $\eta$ and the shear rate square $\dot{\gamma}^2$ are the amplitude of the fourth-order viscosity tensor $\eta_4$ and the rate-of-strain tensor D, respectively. Thus, the tensor form of the equation (16) can be defined as follows:

$$\eta \dot{\gamma}^2 = D : \eta_4 : D \quad (17)$$

Conceptually, the IISO viscosity scalar is obtained:

$$\eta^{IISO} = \frac{D : \eta_4 : D}{\dot{\gamma}^2} = \frac{1}{2}\left[\frac{D : \eta_4 : D}{D : D}\right] = d : \eta_4 : d \quad (18)$$

$$d = \frac{D}{\dot{\gamma}} \quad (19)$$

$$\dot{\gamma} = \sqrt{2D : D} \quad (20)$$

Where $\eta^{IISO}$ is the IISO viscosity, D is the rate-of-strain tensor, $\eta_4$ is the fourth-order viscosity tensor, and $\dot{\gamma}$ is the shear rate. The IISO viscosity $\eta^{IISO}$ is a function of the rate-of-strain tensor D and the fourth-order viscosity tensor $\eta_4$ as shown in equation (18), wherein the fourth-order viscosity tensor $\eta_4$ is a function of orientation tensors $A = [a_{ij}]$ and $A_4 = [a_{ijkl}]$ as shown in equation (10).

The IISO viscosity $\eta^{IISO}$ is referred to as a Rayleigh quotient or a quadratic formula of linear algebra. Thus, the deviatoric stress tensor $\tau$ with the IISO viscosity $\eta^{IISO}$ can be given:

$$\tau = 2\eta^{IISO} \quad (21)$$

The equation (21) above is called an IISO viscosity model. The IISO viscosity model takes into account the effect of the fourth-order viscosity tensor $\eta_4$ on the stress tensor $\tau$, i.e., the model uses the fourth-order viscosity tensor $\eta_4$ to model the effect of the fiber orientation distribution on the flow stress. The IISO viscosity model is to developed to enable anisotropic flow behavior to be captured in existing simulation software of compression molding process in an approximate manner.

Consider the biaxial extension flow's rate-of-deformation tensor D with shear rate $\dot{\gamma}$, and the 1-direction unidirection fiber orientation tensor A, $$D = \dot{\gamma} \& \begin{bmatrix} -0.5 & 0 & 0 \\ 0 & -0.5 & 0 \\ 0 & 0 & 1 \end{bmatrix} \quad A = \begin{bmatrix} 1 & 0 & 0 \\ 0 & 0 & 0 \\ 0 & 0 & 0 \end{bmatrix}$$

Based the flow filed and fiber orientation above, the difference between the fourth-order viscosity tensor component $\eta_{1111}$ and the IISO viscosity scalar can be expressed by Eq. (10) and Eq. (18), respectively.

$$\eta_{ijkl} = H_1 A_{ijkl} + H_2(A_{ij}\delta_{kl} + A_{kl}\delta_{ij}) + H_3(A_{ik}\delta_{jl} + A_{il}\delta_{jk} + A_{jl}\delta_{ik} + A_{jk}\delta_{il}) + H_4(\delta_{ij}\delta_{kl}) + H_5(\delta_{ik}\delta_{jl} + \delta_{il}\delta_{jk}) \quad (10)$$

$$\eta^{IISO} = \frac{D : \eta_4 : D}{\dot{\gamma}^2} = \frac{1}{2}\left[\frac{D : \eta_4 : D}{D : D}\right] = d : \eta_4 : d \quad (18)$$

Figure 2A:
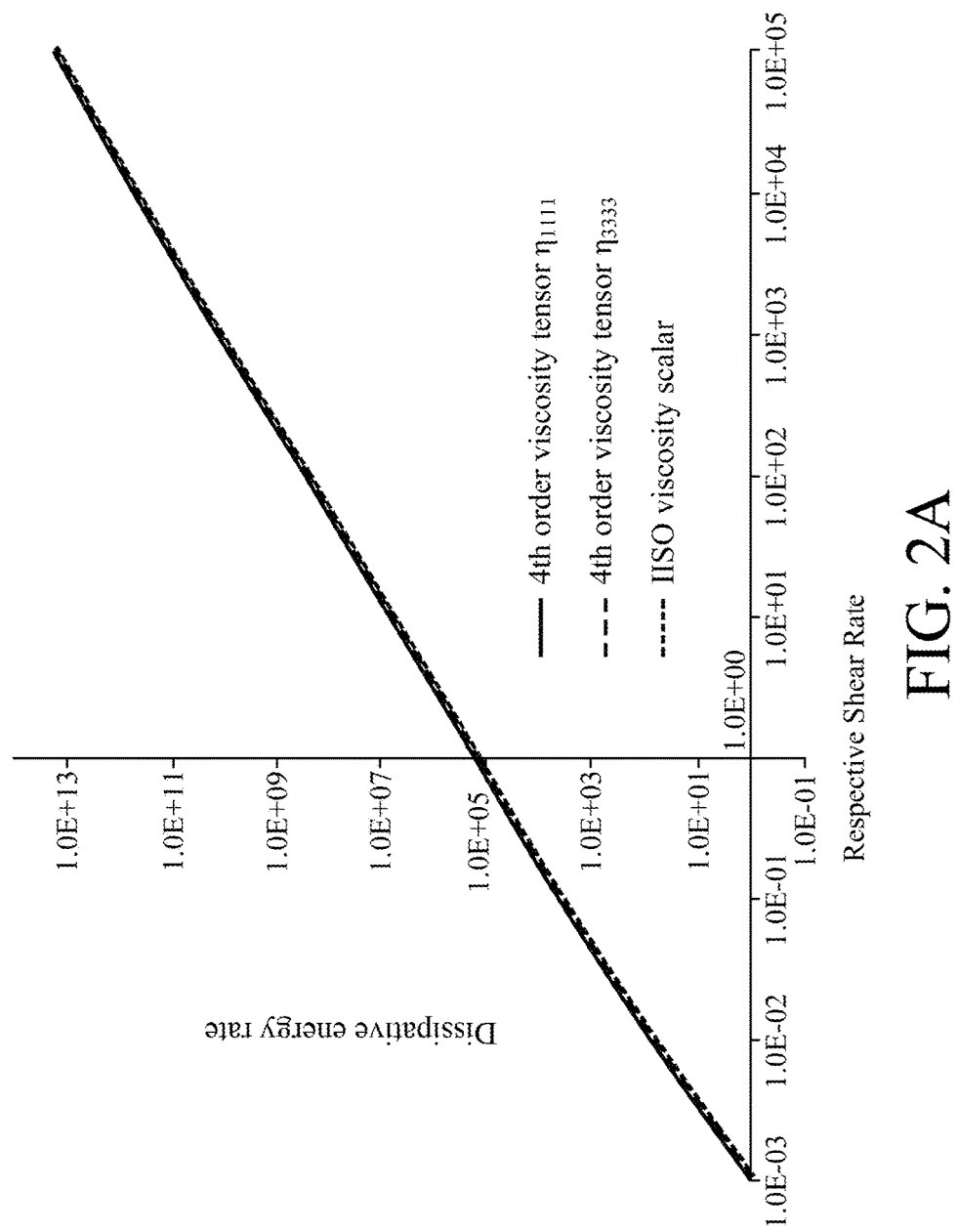
FIG. 2A shows the comparison of the dissipative energy rates ($\dot{E}_D$) between the fourth-order viscosity tensor components ($\eta_{1111}$, $\eta_{3333}$) and the IISO viscosity scalar with respect to the shear rate in accordance with some embodiments of the present disclosure.

FIG. 2A shows the comparison of the dissipative energy rates ($\dot{E}_D$) between the fourth-order viscosity tensor components ($\eta_{1111}, \eta_{3333}$) and the IISO viscosity scalar with respect to the shear rate in accordance with some embodiments of the present disclosure. The fourth-order viscosity tensor component ($\eta_{1111}$) represents the viscosity of the composite molding resin in the direction D1 (primary direction) in FIG. 1B, while the fourth-order viscosity tensor component ($\eta_{3333}$) represents the viscosity of the composite molding resin in the thickness direction, which is perpendicular to both the direction D1 and the direction D2 in FIG. 1B. The dissipative energy rates ($\dot{E}_D$) for the fourth-order viscosity tensor components ($\eta_{1111}, \eta_{3333}$) and the IISO viscosity scalar are the same. In other words, the proposed IISO viscosity is correct.

Figure 2B:
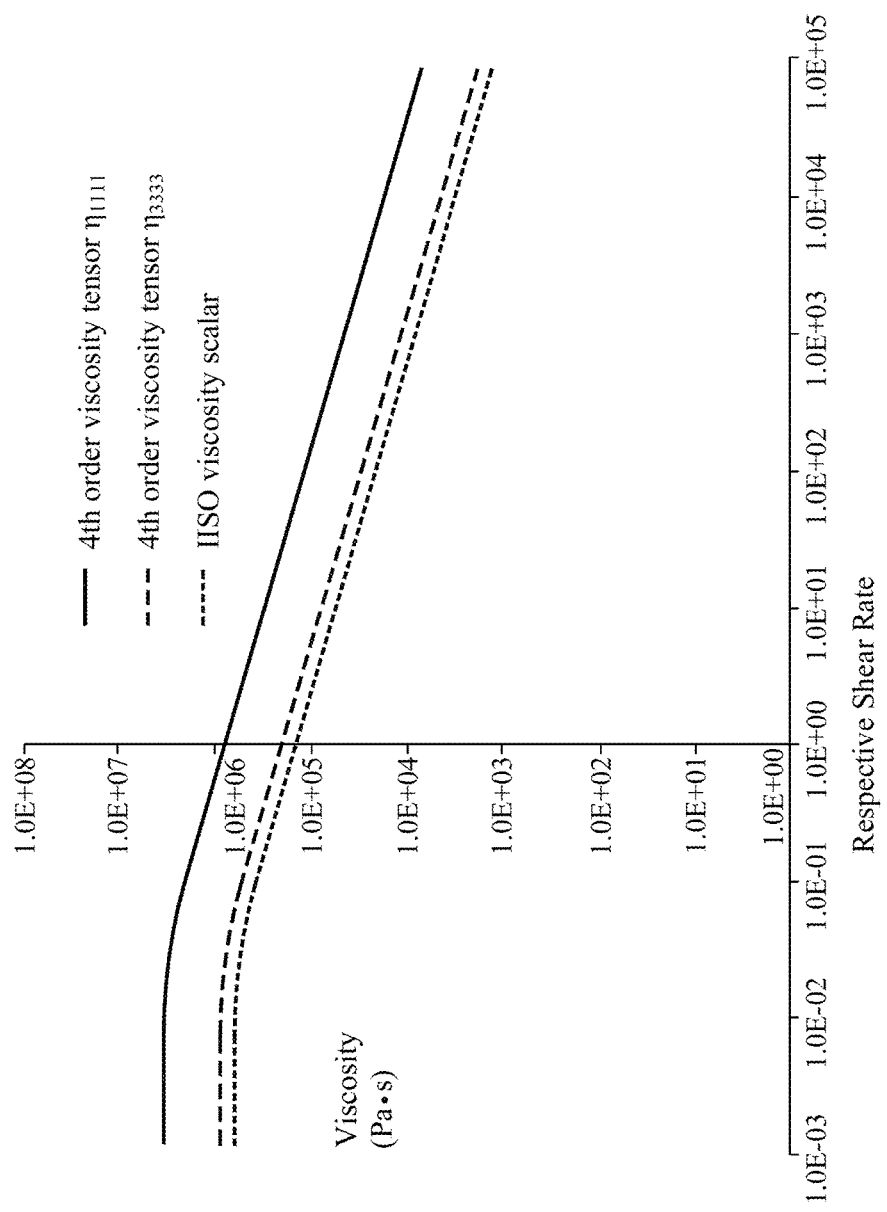
FIG. 2B shows the viscosity comparison between the fourth-order viscosity tensor components ($\eta_{1111}$, $\eta_{3333}$) and the IISO viscosity scalar with respect to the shear rate in accordance with some embodiments of the present disclosure.

FIG. 2B shows the viscosity comparison between the fourth-order viscosity tensor components ($\eta_{1111}, \eta_{3333}$) and the IISO viscosity scalar with respect to the shear rate in accordance with some embodiments of the present disclosure. Referring to Eq. (10), the fourth-order viscosity tensor components ($\eta_{1111}, \eta_{3333}$) are independent of the rate-ofstrain tensor (D); in contrast, referring to Eq. (18), the IISO viscosity is dependent of the rate-of-strain tensor (D). In other words, the IISO viscosity takes into consideration the influence of the rate-of-strain (deformation). There is the same variation with respect to the shear rates; however, the IISO viscosity scalar is less than both the fourth-order viscosity tensor components ($\eta_{1111}, \eta_{3333}$).

Figure 2C:
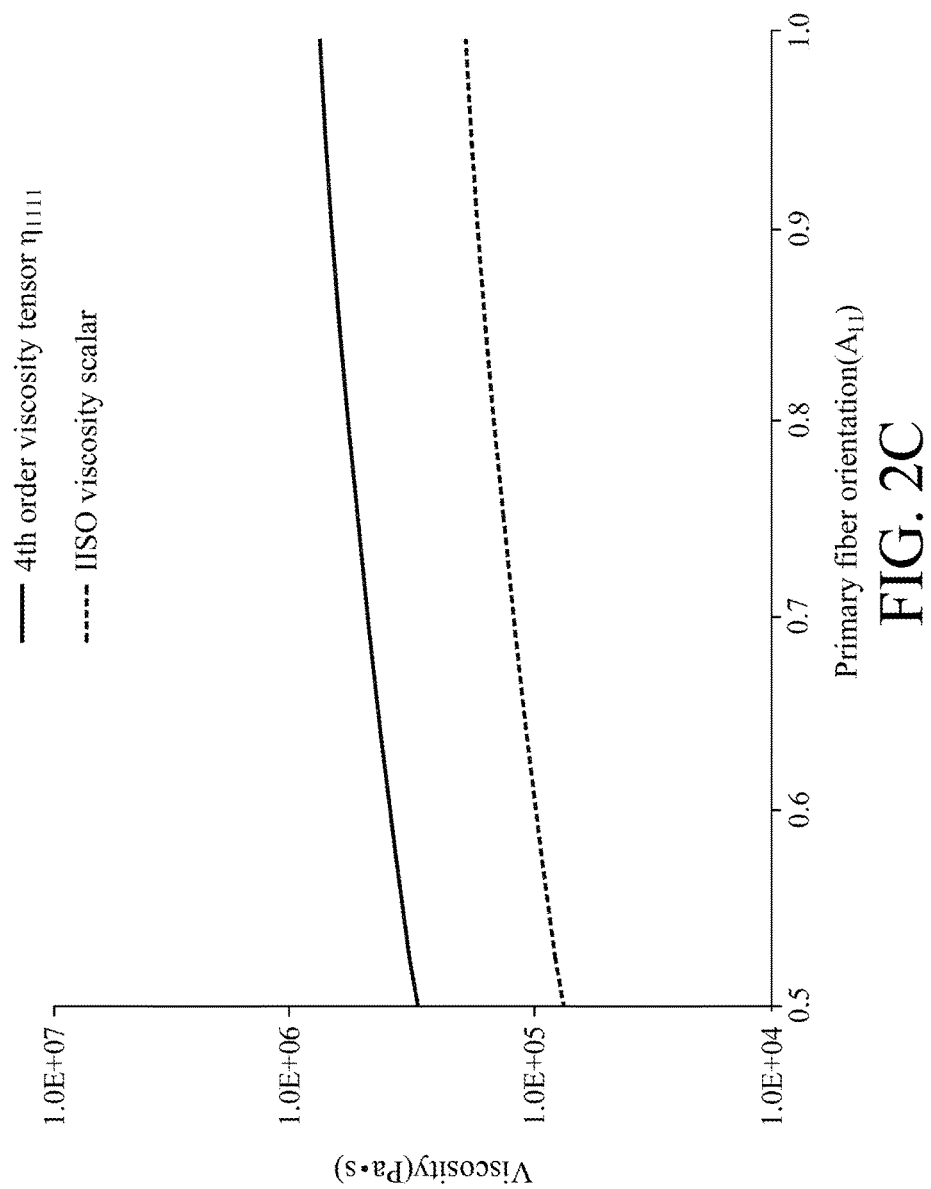
FIG. 2C shows the comparison of the viscosity distributions (anisotropic viscosity distributions) between the fourth-order viscosity tensor component ($\eta_{1111}$) and the IISO viscosity scalar with respect to the primary fiber orientation ($A_{11}$) in accordance with some embodiments of the present disclosure.

FIG. 2C shows the comparison of the viscosity distributions (anisotropic viscosity distributions) between the fourth-order viscosity tensor component ($\eta_{1111}$) and the IISO viscosity scalar with respect to the primary fiber orientation ($A_{11}$) in accordance with some embodiments of the present disclosure. The viscosity increases as the primary fiber orientation ($A_{11}$) increases for both the fourth-order viscosity tensor component ($\eta_{1111}$) and the IISO viscosity scalar.

One aspect of the present disclosure is to apply the IISO viscosity model in molding simulation operations performed in the molding system for preparing an FRT composite article. For example, the IISO viscosity model can be implemented in a commercial molding simulation software, Moldex3D (CoreTech System Co. of Taiwan), to facilitate the fiber orientation distribution predictions.

Figure 3:
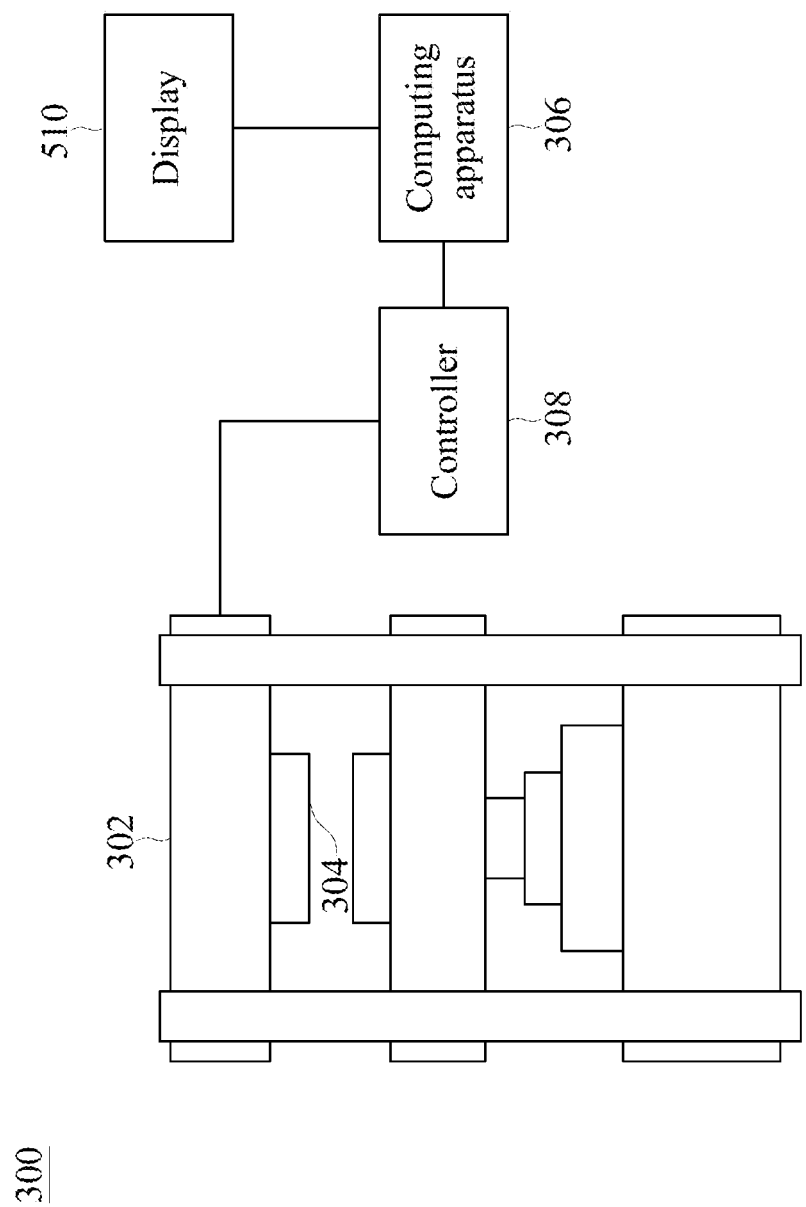
FIG. 3 is a functional block diagram of a molding system in accordance with various embodiments of the present disclosure.

FIG. 3 is a schematic diagram of a molding system 300 in accordance with various embodiments of the present disclosure. The molding system 300 is a compression molding system comprises a compression molding machine 302, a mold 304 disposed on the molding machine 302, and a computing apparatus 306 connected to the molding machine 302.

In some embodiments of the present disclosure, the molding system 300 further comprises a controller 308 connected to the computing apparatus 306 and configured to control the operation of the molding machine 302. In some embodiments of the present disclosure, the molding system 300 further comprises a display 510 configured to visually represent information of a compression molding process, such as simulation molding results.

In some embodiments of the present disclosure, the computing apparatus 306 is configured to perform CAE molding simulation operations and to transmit simulation molding results to the compression molding machine 302 (or the controller 308) through a connection therebetween, such as a hardwired connection or a wireless coupling. Next, the molding machine 302 takes into account the simulation molding results transmitted from the computing apparatus 306, and performs an actual compression molding process to produce the FRT composite article.

Figure 4:
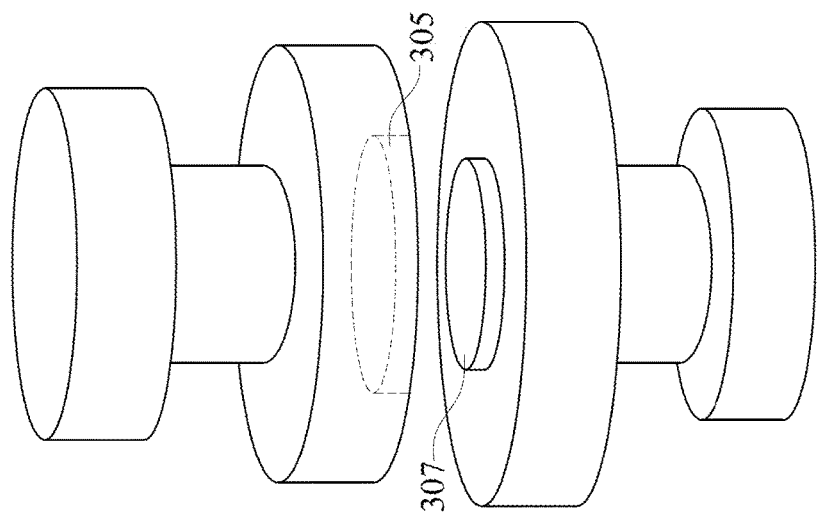
FIG. 4 is a schematic view of a compression molding machine in accordance with some embodiments of the present disclosure.

FIG. 4 is a schematic view of the mold 304 in accordance with some embodiments of the present disclosure. The mold 304 has a mold cavity 305 configured to contain a composite molding resin 307 (such as GMT) during a compression molding process. For example, the GMT in a circular disk shape is put in the mold cavity, then isothermally compressed by the compression molding machine 302.

In some embodiments of the present disclosure, the composite molding resin comprises a polymeric material having a plurality of fibers. In some embodiments of the present disclosure, the fibers are hyper-highly concentrated. In some embodiments of the present disclosure, the concentration of the plurality of fibers in the composite molding resin is greater than approximately 20 percent by volume (20 vol %).

Referring to FIGS. 3 and 4, the computing apparatus 306 is programmed to perform CAE molding simulation operations including the generation of an anisotropic viscosity distribution of the composite molding resin in the mold cavity based on a molding condition for the molding machine, wherein the anisotropic viscosity distribution of the composite molding resin is generated by taking into consideration an orientation distribution of the fibers in the composite molding resin. In some embodiments, the controller 308 coupled to the computing apparatus 306 and configured to control the molding machine 302 with the molding condition to perform an actual molding for the composite molding resin.

In some embodiments of the present disclosure, the anisotropic viscosity distribution of the composite molding resin is represented by a mathematical model, called the IISO viscosity model. In the IISO viscosity model ($\tau = 2\eta^{IISO} D$, equation (21)), the effect of the fourth-order viscosity tensor $\eta_4$ on the stress tensor $\tau$ is taken into account, since the IISO viscosity tensor $\eta^{IISO}$ is a function of the fourth-order viscosity tensor $\eta_4$ (equation (18)). In addition, the fourth-order viscosity tensor $\eta_4$ is used to model the effect of the fiber orientation distribution on the flow stress, since the fourth-order viscosity tensor $\eta_4$ is a function of orientation tensors (equation (10)).

After creation of the mathematical model, the computing apparatus 306 calculates the stress tensor $\tau$ using the mathematical model and then generates the simulation molding result based on the stress tensor $\tau$. In some embodiments of the present disclosure, the simulation molding result is a change of a melt front of the composite molding resin in the mold cavity under a previously defined molding condition.

In some embodiments of the present disclosure, the computing apparatus 306 is programmed to transmit the simulation molding result to the compression molding machine 302 for use by the compression molding machine 302 in performing an actual compression molding process for preparing the FRT composite article.

Figure 5:
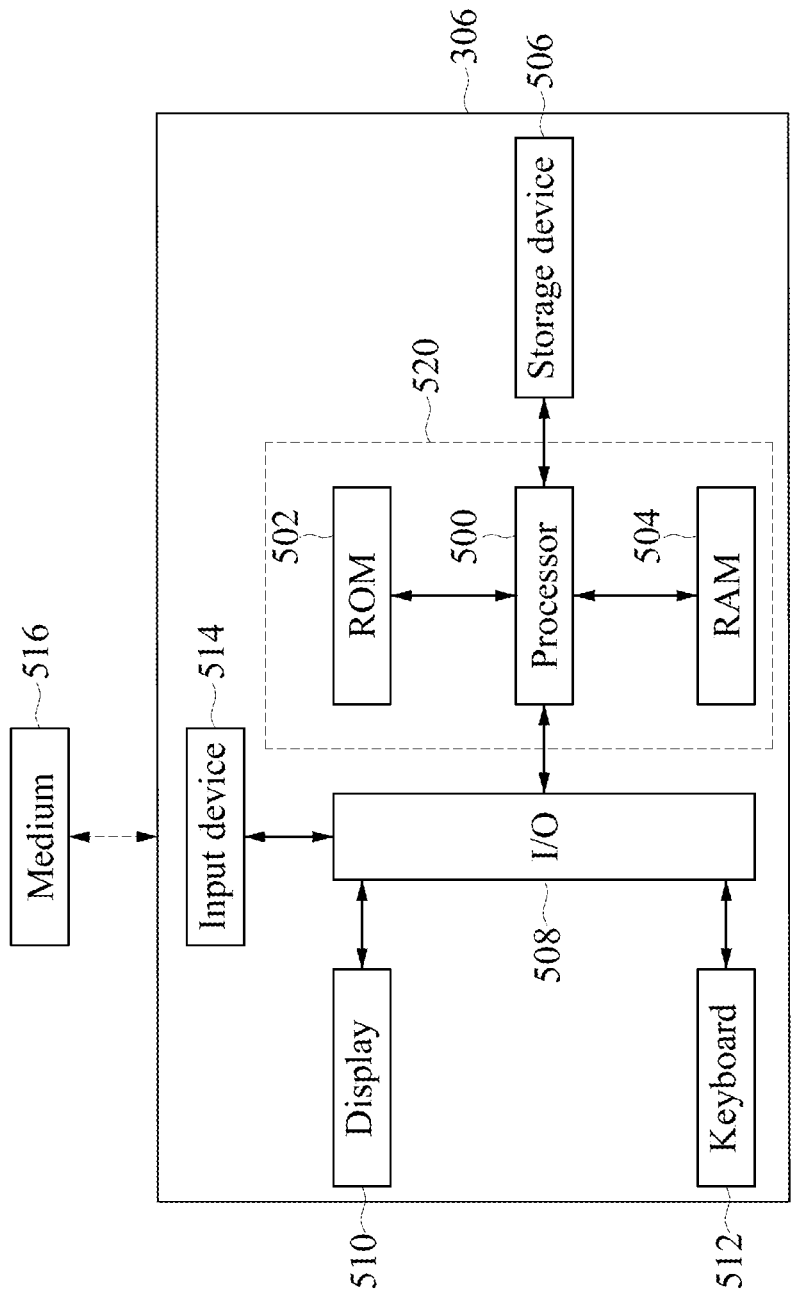
FIG. 5 is a functional block diagram of the computing apparatus in FIG. 3 in accordance with some embodiments of the present disclosure.

FIG. 5 is a functional block diagram of the computing apparatus 306 in FIG. 3 in accordance with some embodiments of the present disclosure. The computing apparatus 306 comprises a processing module 520 for executing CAE simulation software. In some embodiments of the present disclosure, the processing module 520 includes a processor 500a read-only memory (ROM) 502, a random access memory (RAM) 504. In some embodiments of the present disclosure, the computing apparatus 306 further comprises a storage device 506, and an input/output (I/O) interface 508. The processor 500 operably communicates with the ROM 502, the RAM 504, the storage device 506, and the I/O interface 508.

In some embodiments of the present disclosure, the computing apparatus 306 may further include a keyboard 512 and an input device 514, such as a card reader or an optical disk drive. The input device 514 is configured to input computer instructions (software algorithms) stored in a non-transitory computer-readable medium 516, and the processor 500 is configured to execute the computer instructions for performing the CAE molding simulation operations according to the computer instructions. For example, the computer instructions include steps of CAE molding simulation operations.

In some embodiments of the present disclosure, the processor 500 reads the software algorithms from the input device 514 or the storage device 506, executes the steps of CAE molding simulation operations, and stores the simulation result in the RAM 504. In some embodiments of the present disclosure, the memory devices, i.e., the ROM 502 and the RAM 504, can be programmed to store codes for performing the CAE molding simulation operations.

In the CAE molding simulation operations, a virtual molding, i.e., the computer-implemented molding simulation using CAE simulation software, is performed by the computing apparatus 306 for the compression molding process. The simulation results, such as molding conditions, are then set based on the virtual molding and transmitted to the compression molding machine 302. In virtual molding using CAE simulation software, molding phenomena will occur in the mold cavity within a short period of time, i.e., the results of the simulation on composite molding resin temperature, pressure, shear rate, etc. can be observed.

Figure 6:
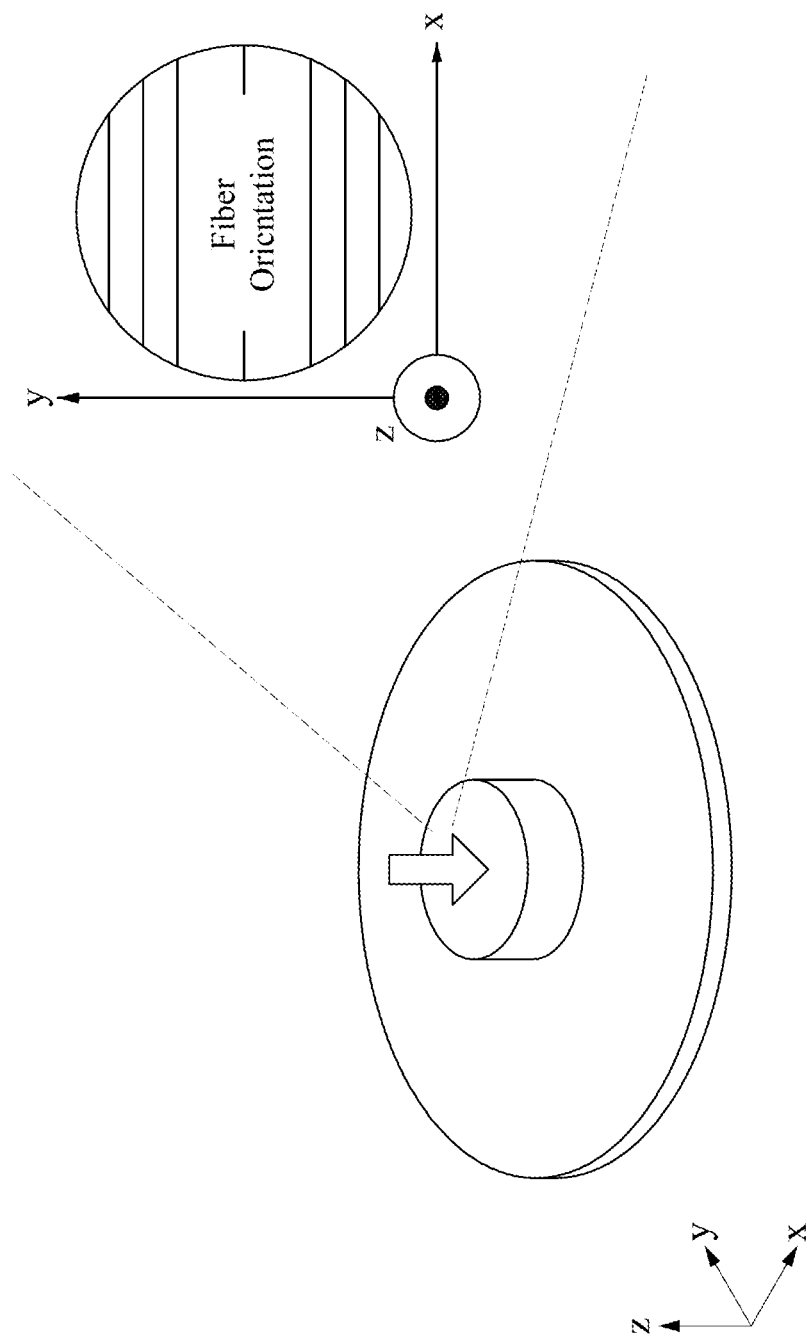
FIG. 6 is a schematic view of a part of a molding system and an initial orientation distribution of a cylinder charge in accordance with some embodiments of the present disclosure.

FIG. 6 is a schematic view of a part of a molding system and an initial orientation distribution of a cylinder charge in accordance with some embodiments of the present disclosure. The cylinder charge (with a volume of about 300 cc) is compressed into a preheated circular disk mold cavity (with a z-axis thickness of 10 mm) at a compression speed of 10 mm/sec. The material of the cylinder charge is polypropylene (PP) melt (at 200° C.) including 25 percent by volume long glass fibers (having aspect ratio (L/D) of 360). The initial fiber alignment distribution of the charge is a perfect x-axial uni-directional orientation ($A_{xx}=1$, $A_{yy}=0$, $A_{zz}=0$).

Figure 7:
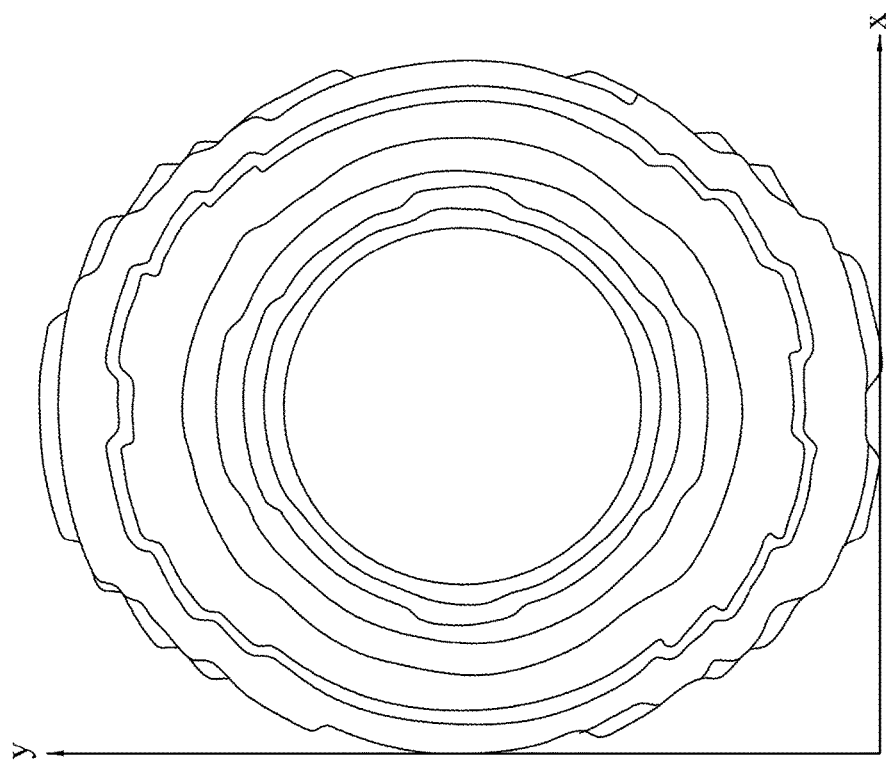
FIG. 7 shows change of melt front from the original circle to the obvious ellipse during the compression of FIG. 6.

FIG. 7 illustrates a change of melt front from the original circle to an obvious elliptical shape during the compression of FIG. 6. FIG. 7 indicates anisotropic flow patterns with the slower X-axis speed and the faster Y-axis speed, and is in agreement with previous research of Ericsson et al.

Figure 8:
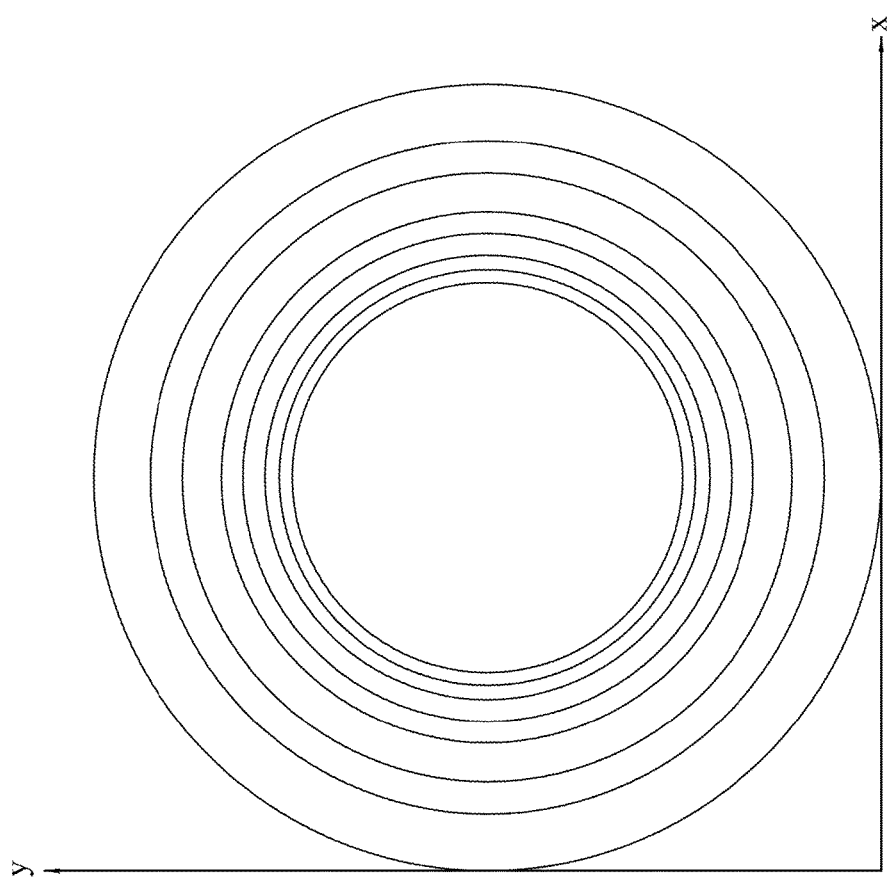
FIG. 8 shows change of melt front of isotropic flow.

FIG. 8 shows a change of melt front of isotropic flow. Given the initial 3D-Random orientation ($A_{xx}=\frac{1}{3}$, $A_{yy}=\frac{1}{3}$, $A_{zz}=\frac{1}{3}$), the circle melt front, namely the isotropic flow, can be seen in FIG. 8. It is thereby demonstrated that the anisotropic viscosity tensor can describe the isotropic viscosity.

Figure 9:
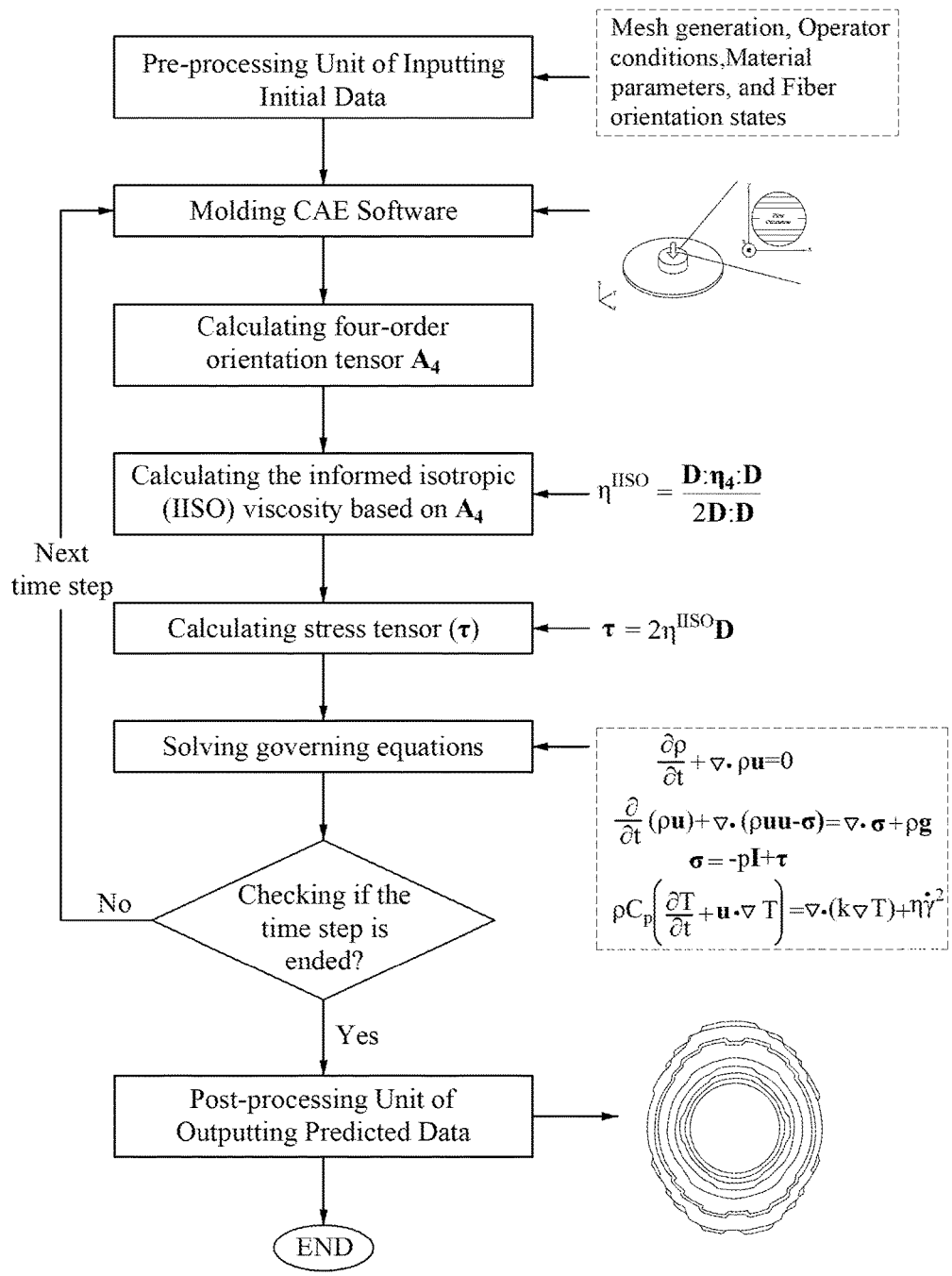
FIG. 9 is a flowchart showing an integration of the fiber orientation prediction technique and the CAE software in accordance with some embodiments of the present disclosure.

FIG. 9 is a flowchart showing an integration of the fiber orientation prediction technique and the CAE software in accordance with some embodiments of the present disclosure. As shown in FIG. 9, the pre-processing unit is configured to create a mesh by dividing at least part of the mold cavity before actually applying a numerical analysis, such as an FEM (finite element method), an FDM (finite difference method) or an FVM (finite volume method). The creation of the mesh uses a technique of modeling an object or fluid (composite molding resin) region to be analyzed with a set of elements, such as rectangular mesh, hexahedral mesh or tetrahedral mesh, in order to perform the subsequent numerical analysis. In some embodiments of the present disclosure, the simulating domain is obtained from a CAD (Computer Aided Design) model used in design and development of a product.

Referring to FIG. 9, an initial orientation distribution ($A_{xx}=1$, $A_{yy}=0$, $A_{zz}=0$) is used to generate the four-order orientation tensor $A_4$, which is then used to generate the informed isotropic (IISO) viscosity in the mesh. Subsequently, the anisotropic viscosity distribution (the informed isotropic (IISO) viscosity) is used to generate the stress tensor r, and the CAE software is then used to solve the governing equations of the molding process based on a molding condition for the molding machine.

The mechanical property of the molded article is correlated with the orientation distribution of the fibers. If the simulated orientation distribution of the fibers with the corresponding mechanical property does not meet the specification of the molded FRT article, the fiber parameters or the molding condition may be adjusted, and another simulation is performed to obtain an updated orientation distribution of the fibers in the composite molding resin while using the adjusted fiber parameter or the molding condition.

The present disclosure provides a molding system for preparing a fiber-reinforced thermoplastic (FRT) composite article, comprising a molding machine; a mold disposed on the molding machine and having a mold cavity to be filled with a composite molding resin including a polymeric material having a plurality of fibers; a processing module configured to generate an anisotropic viscosity distribution of the composite molding resin in the mold cavity based on a molding condition for the molding machine; and a controller coupled to the computing apparatus and configured to control the molding machine with the molding condition to perform an actual molding for the composite molding resin. The anisotropic viscosity distribution of the composite molding resin is generated by taking into consideration an orientation distribution of the fibers in the composite molding resin.

Although the present disclosure and its advantages have been described in detail, it should be understood that various changes, substitutions and alterations can be made herein without departing from the spirit and scope of the disclosure as defined by the appended claims. For example, many of the processes discussed above can be implemented in different methodologies and replaced by other processes, or a combination thereof.

Moreover, the scope of the present application is not intended to be limited to the particular embodiments of the process, machine, manufacture, composition of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. A molding system for preparing a composite article, comprising:
   a molding machine;
   a mold disposed on the molding machine and having a mold cavity to be filled with a composite molding resin including a polymeric material having a plurality of fibers;
   a processing module configured to generate an anisotropic viscosity distribution of the composite molding resin in the mold cavity based on a molding condition for the molding machine, wherein the anisotropic viscosity distribution of the composite molding resin is generated by taking into consideration an orientation distribution of the fibers in the composite molding resin; and
   a controller coupled to the processing module and configured to control the molding machine with the molding condition using the generated anisotropic viscosity distribution of the composite molding resin to perform an actual molding for the composite molding resin.

2. The molding system of claim 1, wherein the anisotropic viscosity distribution of the composite molding resin carries information of the orientation distribution of the fibers.

3. The molding system of claim 1, wherein the anisotropic viscosity distribution of the composite molding resin is represented using an expression:

$$\eta^{IISO} = \frac{D:\eta_4:D}{2D:D}$$

where $\eta^{IISO}$ represents an informed isotropic viscosity, D represents a rate-of-strain tensor, and $\eta_4$ represents a fourth-order viscosity tensor.

4. The molding system of claim 3, wherein the fourth-order viscosity tensor carries information of the orientation distribution of the fibers.

5. The molding system of claim 3, wherein the fourth-order viscosity tensor is a function of a second-order orientation tensor.

6. The molding system of claim 1, wherein the processing module is configured to generate a stress distribution of the composite molding resin by taking into consideration the anisotropic viscosity distribution.

7. The molding system of claim 6, wherein the stress distribution of the composite molding resin is represented using an expression:

$$\tau = 2\eta^{IISO}D$$

$$\eta^{IISO} = \frac{D:\eta_4:D}{2D:D}$$

where $\tau$ represents a stress tensor, $\eta^{IISO}$ represents an informed isotropic viscosity, D represents a rate-of-strain tensor, and $\eta_4$ represents a fourth-order viscosity tensor.

8. The molding system of claim 1, wherein the processing module is configured to convert the anisotropic viscosity distribution of the composite molding resin from a tensor form into a scalar form.

9. The molding system of claim 8, wherein the anisotropic viscosity distribution of the composite molding resin is represented using a fourth-order viscosity tensor.

10. The molding system of claim 9, wherein the anisotropic viscosity distribution is represented in the scalar using an expression:

$$\eta^{IISO} = \frac{D:\eta_4:D}{2D:D}$$

where $\eta^{IISO}$ represents an informed isotropic viscosity, D represents a rate-of-strain tensor, and $\eta_4$ represents the fourth-order viscosity tensor.

11. The molding system of claim 1, wherein the processing module is configured to convert the anisotropic viscosity distribution of the composite molding resin from a tensor form into a scalar form by applying an equation of viscous dissipation energy.

12. The molding system of claim 11, wherein a rate of viscous dissipation energy is represented in the scalar form using an expression:

$$\dot{E}_D = \eta\dot{\gamma}^2$$

where $\eta$ represents a shear viscosity and $\dot{\gamma}^2$ represents a shear rate square.

13. The molding system of claim 12, wherein the tensor form of the anisotropic viscosity distribution is represented using an expression:

$$\eta\dot{\gamma}^2 = D:\eta_4:D$$

where $\eta_4$ represents a fourth-order viscosity tensor, and D represents a rate-of-strain tensor.

* * * * *

UNITED STATES PATENT AND TRADEMARK OFFICE
CERTIFICATE OF CORRECTION

Page 1 of 1

PATENT NO. : 10,201,918 B1
APPLICATION NO. : 16/027925
DATED : February 12, 2019
INVENTOR(S) : Anthony J. Favaloro It is certified that error appears in the above-identified patent and that said Letters Patent is hereby corrected as shown below:

In the Specification

The following paragraph is added before the heading in Column 1, Line 5:
"This invention was made with government support under DGE-1333468 awarded by the National Science Foundation. The government has certain rights in the invention."

Signed and Sealed this
Thirtieth Day of April, 2019

Andrei Iancu
*Director of the United States Patent and Trademark Office*